United States Patent [19]

Tischer et al.

[11] Patent Number: 4,553,389
[45] Date of Patent: Nov. 19, 1985

[54] HYDROSTATIC AUXILIARY STEERING APPARATUS

[75] Inventors: Werner Tischer, Heubach-Lautern; Karl-Heinz Liebert, Schwäbisch Gmünd; Rolf Fassbender, Mutlangen, all of Fed. Rep. of Germany

[73] Assignee: Zahnradfabrik Friedrichshafen, AG., Friedrichshafen, Fed. Rep. of Germany

[21] Appl. No.: 404,697

[22] Filed: Aug. 3, 1982

[30] Foreign Application Priority Data

Aug. 17, 1981 [DE] Fed. Rep. of Germany ....... 3132342

[51] Int. Cl.$^4$ .............. B62D 5/08; F15B 13/06; F15B 13/09; F16H 39/46
[52] U.S. Cl. ........................... 60/384; 60/387; 60/421; 60/422; 60/430; 91/516; 91/517; 91/532; 180/132
[58] Field of Search ............. 60/384, 387, 421, 422, 60/428, 430, 450, 452, 484, 486; 91/514, 516, 517, 518, 532; 180/132

[56] References Cited

U.S. PATENT DOCUMENTS

| 3,760,689 | 9/1973 | Johnston | 91/518 |
| 3,915,253 | 10/1975 | Ott et al. | 60/384 |
| 3,931,711 | 1/1976 | Rau et al. | 180/132 |
| 3,968,811 | 7/1976 | Fillion | 60/421 |
| 3,975,909 | 8/1976 | McBurnett | 60/421 |
| 4,034,563 | 7/1977 | Orth | 60/422 |
| 4,043,419 | 8/1977 | Larson et al. | 60/450 |
| 4,044,786 | 8/1977 | Yip | 60/421 |
| 4,096,883 | 6/1978 | Yip | 60/384 |
| 4,174,018 | 11/1979 | Liebert et al. | 91/532 |
| 4,336,687 | 6/1982 | Morgan | 60/384 |
| 4,337,620 | 7/1982 | Johnson | 60/421 |
| 4,343,151 | 8/1982 | Lorimor | 60/422 |

Primary Examiner—Charles T. Jordan
Assistant Examiner—Richard Klein
Attorney, Agent, or Firm—Zalkind & Shuster

[57] ABSTRACT

In a hydrostatic auxiliary power steering apparatus, a short-circuit passage of a control valve establishes a restricted flow path from a pump pressure line to a reservoir return line in the neutral position of the control valve wherein all other flow paths are blocked. A fixed flow restrictor in the pump pressure line conducts a continuous flow from one of two pumps connected to the pressure line for regulation of the fluid power steering circuit by the pressure drop across the flow restrictor. If one of the pumps is of the variable volume type, the pressure downstream of the flow restrictor is utilized to regulate pump flow adjustment. If fluid under operating pressure is supplied to both the fluid power steering circuit and another fluid operating circuit, a flow dividing valve controlled by the pressure differential across the flow restrictor distributes pressurized fluid between the two fluid circuits.

10 Claims, 4 Drawing Figures

HYDROSTATIC AUXILIARY STEERING APPARATUS

BACKGROUND OF THE INVENTION

This invention relates to a hydrostatic auxiliary power steering apparatus of a type having a metering pump and control valve manually actuated by a hand steering wheel with the control valve being displaced from a neutral position in opposite directions against the bias of spring elements to establish flow paths for fluid to and from the metering pump and a servomotor hydraulically locked in the neutral position of the control valve.

Auxiliary power steering devices of the foregoing type are already known from the disclosures in U.S. Pat. No. 4,096,883 to Yip and German patent publication No. 27 28 118. The Yip patent discloses a hydrostatic auxiliary power steering device of the neutral, flow-blocking type with load signal adjustment of the main, variable volume servo pump having a stroke that varies in accordance with the power input of the steering gear. This known auxiliary power steering device, however, cannot be operated by a second, constant volume type servo pump serving as an emergency fluid power source should failure of the main servo pump occur. An emergency steering pump connected to the available restricted pump bypass passage would not be suitable because the bypass flow stream would be so small that it is only capable of heating the control valve. Enlarging the size of the bypass passage is not feasible since its intended function of regulating maximum pressure would be adversely affected thereby. Furthermore, opening of such bypass passage to the operating fluid path below maximum pressure leads to overcontrol reaction by the steering system. Nevertheless, use of emergency servo pumps is desirable for steering safety purposes, and its installation may already be a legal requirement in certain jurisdictions.

Similar problems arise with respect to the steering apparatus disclosed in German patent publication No. 27 28 118. In the latter type apparatus, a flow directing valve is provided for distribution of pressurized operating fluid to the power steering circuit and to the fluid circuits of other fluid powered apparatus. For that reason, a constant volume pump is utilized instead of a variable volume servo pump. In such an arrangement, the use of an emergency steering pump is not possible because of the use of a control valve which blocks flow in its neutral position. Provision of an emergency steering pump of a constant volume type supplying pressurized fluid to the control valve in its neutral, flow-blocking position, would require the use of an excess pressure valve that would lead to significant heating of the operating fluid or oil.

It is therefore an important object of the present invention to provide an improved hydrostatic auxiliary power steering apparatus having a control valve with a neutral, flow-blocking position and an emergency steering pump of the constant flow type that is operable for power assist steering even when the main pump is operational, the main pump being either of the variable volume type supplying a steering power circuit or of a constant volume type supplying plural fluid operating circuits with priority for the steering power circuit.

SUMMARY OF THE INVENTION

In accordance with the present invention, a fixed flow restrictor is disposed in the pressure supply conduit from the servo pump of the auxiliary power steering apparatus to conduct fluid to a short circuiting flow path in the control valve. Fluid flow is also continuously conducted through the restrictor from an emergency steering pump connected in parallel to the main servo pump. Upstream of the flow restrictor, a pressure flow branch conducts fluid from the pressure conduit to the metering pump and the steering servo motor while downstream of the flow restrictor a flow return branch conducts fluid to the reservoir. The pressurized fluid from the emergency steeering pump flowing through the restrictor provides a pilot signal fed through control lines connected upstream and downstream of the restrictor for adjustment of a variable volume type main pump and/or control of a flow dividing control valve. In this manner, the fluid flow output of the main pump may be reduced towards zero as long as there is little or no fluid flow return from the steering apparatus. In a steering system operated by a main pump of the constant volume type, all of the fluid flow from the main pump may be supplied to fluid loads other than the steering device when operational under the lower output of the emergency steering pump alone.

Since the output of the emergency steering pump is designed for steering operation at low vehicle speeds in the event of a main pump failure, a relatively reduced size emergency pump may be selected. Furthermore, since the emergency steering pump continuously contributes to the servo steering power assist of the auxiliary steering system, the main pump may also be reduced in size to meet anticipated load demands.

BRIEF DESCRIPTION OF THE DRAWING FIGURES

The invention is described hereinafter in greater detail with reference to several embodiments shown in the accompanying drawings, wherein.

DETAILED DESCRIPTION OF THE PREFERRED EMBODIMENTS

Figure 1:
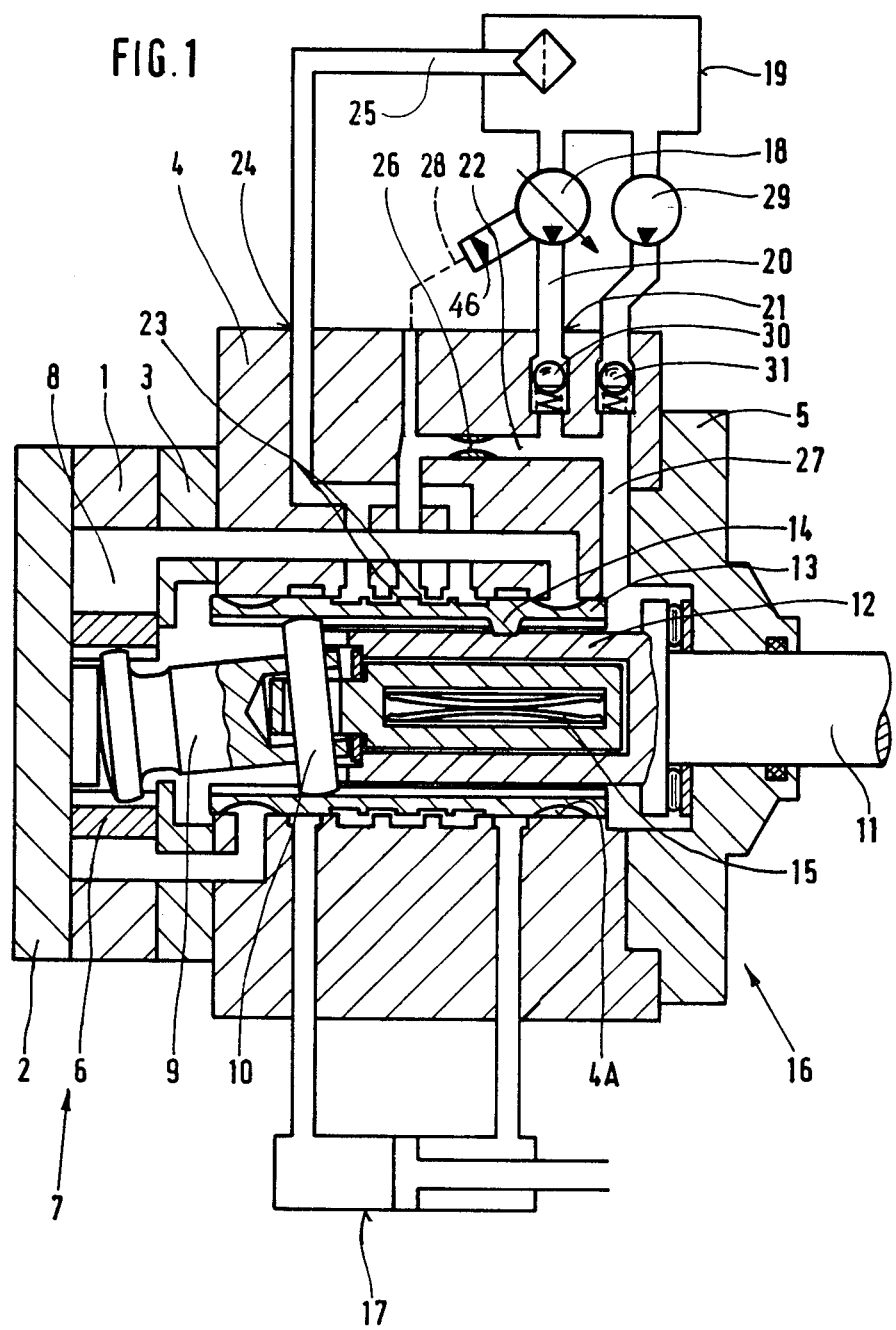
FIG. 1 is a side section view with associated fluid circuitry in accordance with one embodiment of the invention.

In the embodiment of the invention illustrated in FIG. 1, an internally toothed stator ring 1 is disposed between a cover 2 and an intermediate deflector ring 3 attached to one axial end of a housing 4 to which another closure cover 5 is attached at the other axial end. An externally toothed gear rotor 6 enmeshed with the teeth of the stator ring has one tooth less than that of the stator ring 1 and forms therewith a metering pump device 7 that is manually driven. Radially between the teeth of the stator ring 1 and the rotor 6 and axially between the adjacent confronting faces of the cover 2 and the intermediate ring 3 are formed fluid displacing pockets 8. The gear rotor 6 is operatively connected by a universal joint shaft 9 and follower pin 10 with torsional lossmotion to a drive shaft 11. The drive shaft 11 is formed with a hollow sleeve 12 for actuation of a rotatable slide valve member 13 of a control valve 16.

The valve member 13 is mounted within an internal bore 4A of the housing 4 in coaxial relation to valve actuating sleeve portion 12 of the drive shaft 11 and is axially displaceable in opposite directions by rotation of the drive shaft through coarse threads 14 internally formed on the valve member. A spring element 15 is disposed between the universal shaft 9 and the drive shaft 11 for lost motion take-up. The valve member 13 and the valve body housing 4 are provided in a known manner with the necessary flow passages of the control valve 16 as diagrammed in FIG. 2 through which pressure regulation is effected and the flow of fluid is controlled to and from the fluid displacing pockets 8 of the metering pump device 7 and the pressure chambers of a steering servomotor 17.

Figure 2:
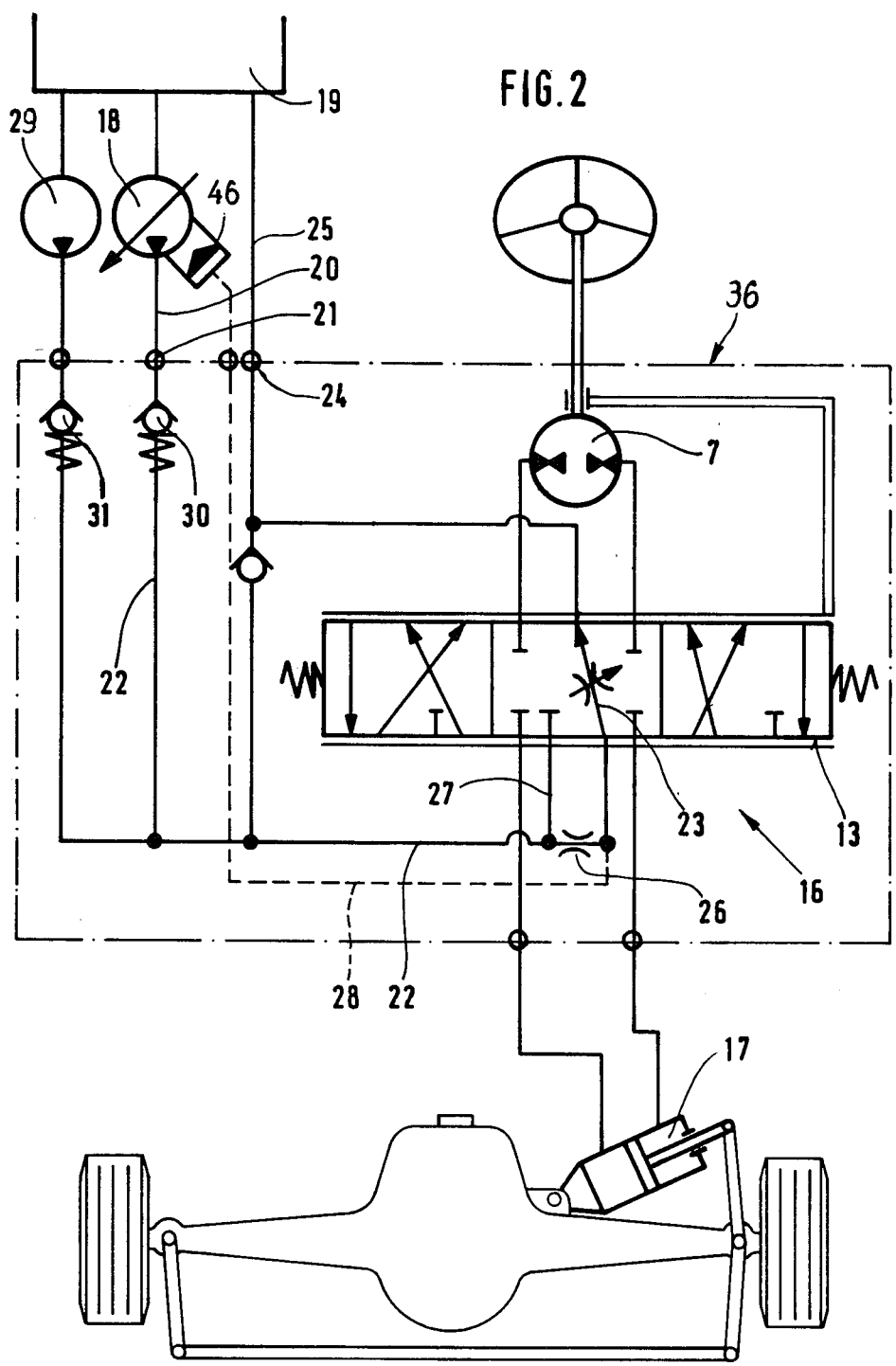
FIG. 2 is a fluid circuit diagram of the steering apparatus illustrated in FIG. 1.

A high pressure pump 18 of the variable volume type, as shown in FIGS. 1 and 2, supplies pressurized fluid withdrawn from a fluid reservoir container 19 to a pressure line 20 connected at inlet port 21 of the fluid steering circuit 33 to a pressure supply passage 22 within the valve body housing 4. The pressurized fluid is thereby conducted to a short circuit passage 23 formed by control grooves in the valve member 13, such short circuit passage being opened with least restriction in the neutral position of the control valve 16 to conduct fluid to a return port 24 and return line 25 connected to the fluid reservoir container 19. A flow restrictor 26 having a constant cross sectional flow area less than that of the short circuit passage 23 in the neutral position of the control valve is disposed within the pressure supply passage 22 between the pressure inlet port 21 and the shortcircuit passage 23.

Also formed in the valve body housing 4 is a pressure branch passage 27 connected to the pressure supply passage 22 upstream of the flow restrictor 26. Pressure fluid flow in branch passage 27 is blocked by the control valve in its neutral position. Displacement of the control valve from the neutral position controls flow through the branch passage 27 to the metering pump device 7 and at the same time increases return flow restriction in the short circuit passage 23 to regulate the operating pressure. In the end limit positions of the control valve flow through the short circuit passage 23 is completely blocked.

Another control line branch passage 28 is connected to the pressure supply passage 22 downstream of the flow restrictor 26 through which fluid is fed to a volumetric adjustment device 46 associated with the pump 18. A second high pressure pump 29 of the constant volume type constituting an emergency steering pump is connected to the pressure supply passage 22 at a location upstream of the flow restrictor 26 and in parallel with the main pump 18. Pressurized fluid continuously flows from both pumps in the neutral position of the control valve 16 through the flow restrictor 26 to the short circuit passage 23 so that a pressure drop across the flow restrictor 26 is established. The pressurized fluid downstream of the flow restrictor conducted through control passage 28 to the variable volume pump 18, regulates its volumetric output in accordance with the reduction in the loading resulting from fluid flow from the emergency steering pump 29. Accordingly, the output flow of the main pump 18 is reduced until the output flow of the emergency steering pump is no longer sufficient to meet the load demand of the steering apparatus. Thus, the emergency steering pump 29 is operational during normal steering operation so that both pumps may be of reduced capacity design. The two pumps are respectively coupled to the common pressure supply passage 22 through check valves 30 and 31.

Figure 3:
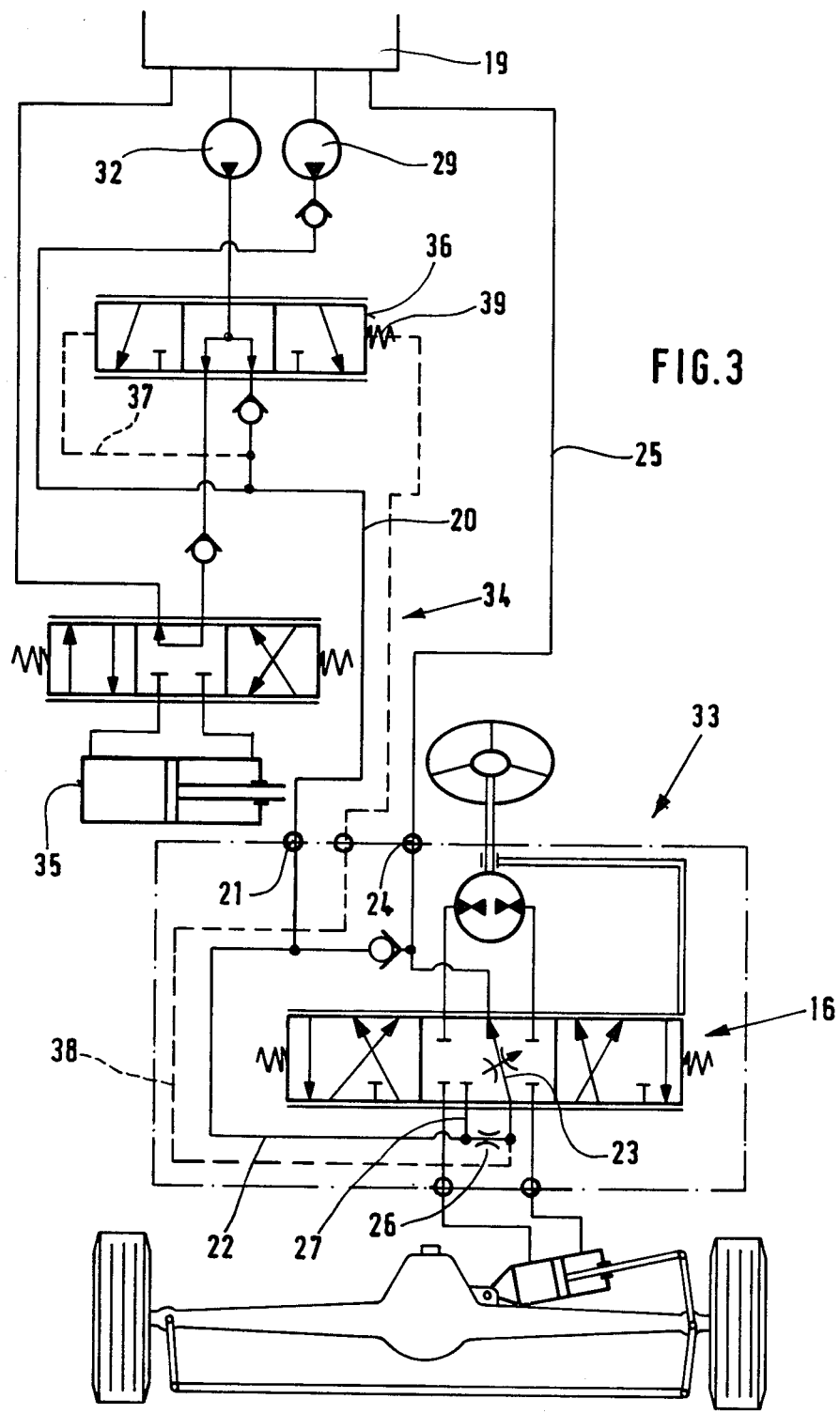
FIG. 3 is a fluid circuit diagram associated with steering apparatus in accordance with another embodiment of the invention.

Another embodiment of the invention is illustrated in FIG. 3 which is similar in its essential inventive features to the embodiment of FIGS. 1 and 2 so that components performing the same functions are designated by the same reference numerals. In lieu of a main pump of the variable volume type, the embodiment of FIG. 3 utilizes a constant volume type of high pressure pump 32. Fluid is conducted to and from the fluid power steering circuit 33 as hereinbefore described with respect to FIGS. 1 and 2 and in addition, to and from another fluid power operating circuit 34 associated with another fluid operated device 35. The fluid operating circuit 34 is supplied with pressurized fluid by the same constant volume pump 32 through a flow dividing valve 36. In order to provide operational priority for the fluid power steering circuit 33, the flow dividing valve 36 is controlled by the differential pressure established on the upstream and downstream sides of the flow restrictor 26. Toward that end, control pressure branch lines 37 and 38 conduct opposing valve actuating pressures to the flow dividing valve 36. Control pressure line 37 is connected to the upstream side of the flow restrictor 26 through line 20, port 21 and passage 22, while control line 38 is connected to the downstream side of the flow restrictor 26.

The flow dividing valve 36 is arranged so that both fluid operated devices may be supplied with pressurized fluid in the neutral position of the control valve 16. In one end position of the flow dividing valve, to which it is biased by a spring 39, the entire output flow of the constant volume pump 32 is supplied to the power steering circuit 33. The pressure at the downstream side of the flow restrictor 26 in control line 38 acts on the flow dividing valve in such a direction to effect such positioning of the valve. The pressure at the upstream side of the flow restrictor acts through control line 37 in the other direction on the flow dividing valve 36 against the bias of spring 39 to position the valve in the other end position. In such other end position of the valve 36, the entire output flow of the constant volume pump 32 is supplied to the fluid operating circuit 34.

In the embodiment of FIG. 3, the emergency steering pump 29, as in the first embodiment, is capable of meeting the demand of the fluid power steering apparatus at relatively low steering speeds. In such an operational mode, the entire output flow from the constant volume pump 32 is available for operating the fluid power circuit 34. Only if there is an increased load demand applied to the power steering circuit 33 will the constant volume pump 32 contribute to fluid supply to circuit 33 to maintain a high degree of operational steering reliability.

Figure 4:
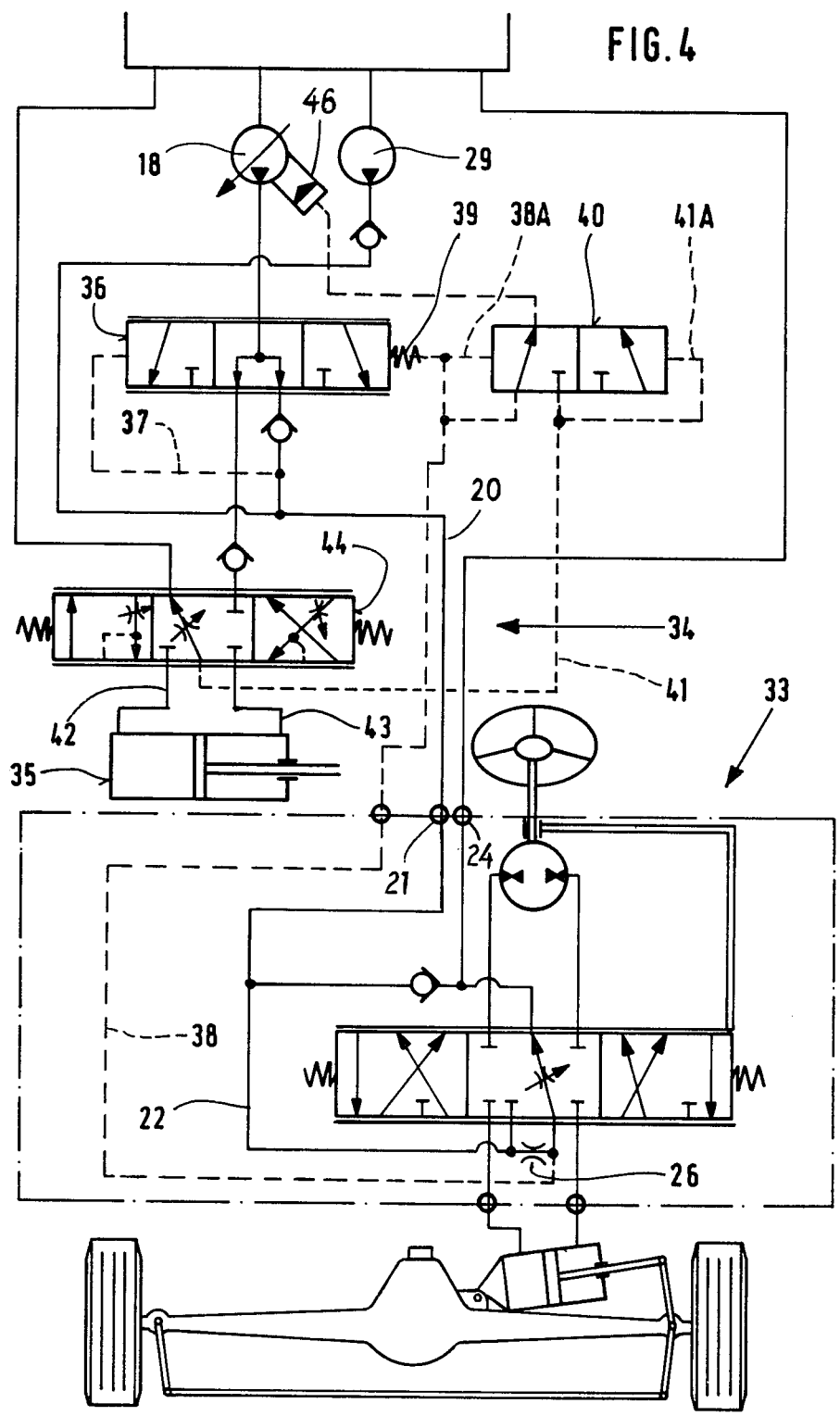
FIG. 4 is a fluid circuit diagram associated with steering apparatus in accordance with yet another embodiment of the invention.

The embodiment of the invention depicted in FIG. 4 is basically a combination of features associated with the embodiments of FIGS. 2 and 3. According to the embodiment of FIG. 4, the constant volume main pump 32 associated with the embodiment of FIG. 3 is replaced by a high pressure pump of the variable volume type corresponding to pump 18 of FIGS. 1 and 2. The flow dividing valve 36 of FIG. 3 is retained in the embodiment of FIG. 4 under control of the differential pressure on upstream and downstream sides of the flow restrictor 26 transmitted by valve actuating control lines 37 and 38. Volumetric adjustment of pump 18 is, however, effected through a two-way valve 40. The valve 40 is actuated by the higher of the operating pressure fluid respectively supplied to the fluid power circuits 33 and 34. Thus, one axial end of the two-way valve 40 is connected through a valve actuating control line 38A to the control line 38 from the power steering circuit 33 while the other axial end of the valve 40 is connected by an actuating pressure line 41A to pressure line 41 from the fluid operating circuit 34. The pressure line 41 is hydraulically connected to operating pressure line 42 or 43 of the pressure operated device 35 by means of a control valve 44 associated with the fluid operating circuit 34. Thus, the higher operating pressure of either circuit 33 or 34 is always applied through the two-way valve 40 to adjustment device 46 for volumetric adjustment of pump 18. The continuous supply of sufficient pressurized fluid for both circuits 33 and 34 is thereby assured since the circuit having the higher power requirements and therefore operated at a higher pressure level controls adjustment of pump 18. Only the flow dividing valve 36 responds to the pressure drop across the flow restrictor 26 to maintain the circuit 33 operational.

We claim:

1. In a hydrostatic auxiliary power steering apparatus having a metering pump, a servomotor, a main pump, a reservoir from which fluid is drawn by the main pump and a fluid power steering circuit including a control valve displaceable from a neutral position in which flow through the metering pump is blocked; short-circuit passage means for recirculating the fluid from the main pump to the reservoir with increasing flow restriction in response to displacement of the control valve from the neutral position, a second constant volume pump, and a pressure passage to which the fluid pressurized by the main pump is conducted to the control valve, the improvement comprising a flow restrictor (26) disposed within the pressure passage (22) which has a fixed flow area less than that of the short-circuit passage means (23) in the neutral position of the control valve (16), branch passage means (27) connected to the pressure passage upstream of the flow restrictor for conducting the pressurized fluid to the servomotor (17) through the metering pump (7) in response to said displacement of the control valve from the neutral position, means responsive to a reduction in flow through the flow restrictor for unloading the main pump and means (31) connecting the second pump (29) to the pressure passage in parallel with the main pump (18, 32) for continuously conducting the pressurized fluid through the flow restrictor to the short-circuit passage means.

2. The improvement as defined in claim 1, wherein the main pump (18) is of the variable volume type having flow volume adjusting means (46), and control passage means (28) connecting the pressure passage (22) downstream of the flow restrictor (26) to the flow volume adjusting means of the main pump for adjustment thereof.

3. The apparatus as defined in claim 1, wherein the fluid power steering circuit further includes an inlet port (21) through which the pressure passage (22) is connected to the main pump, and an outlet port (24) through which the short-circuit passage means (23) is connected to the reservoir (19) to which the fluid is exhausted from the servomotor.

4. In combination with the apparatus as defined in claim 3, an additional fluid operating circuit (34), and flow dividing valve means (36) connecting the main pump to the additional fluid operating circuit and to the inlet port (21) of the fluid power steering circuit for priority supply of the pressurized fluid thereto.

5. The combination as defined in claim 4 wherein the dividing valve means (36) includes a valve member displaceable in opposite directions to positions in which the pressurized fluid from the main pump (18, 32) is supplied exclusively to one of the circuits (33 and 34), a spring (39) biasing the valve member in one of said opposite directions to one of said positions in which the pressurized fluid is supplied exclusively to the power steering circuit (33), said pump unloading means (38) being connected to the pressure passage (22) downstream of the flow restrictor (26) for urging the valve member in said one of the opposite directions, and fluid actuating means (37) connected through the inlet port (21) to the pressure passage upstream of the flow restrictor (26) for urging the valve member in the other of said opposite directions against the bias of the spring (39).

6. The combination as defined in claim 5, wherein the main pump (32) is of the constant volume type.

7. In combination with the apparatus as defined in claim 1, an additional fluid operating circuit (34) to which fluid under an operating pressure is supplied, and flow dividing valve means (36) interconnecting the main pump (18, 32) with both of the circuits (33 and 34) for supply thereto of the fluid under said operating pressure with priority to the fluid power steering circuit (33).

8. The combination as defined in claim 7, including fluid actuating means (37, 38) for applying a differential valve adjusting pressure to the flow dividing valve means that is a function of the pressure drop across the flow restrictor (26).

9. The combination as defined in claim 8, wherein the main pump (18) is of the variable volume type having flow volume adjusting means (46).

10. The combination of claim 9, including two-way valve means (40) connecting the flow volume adjusting means of the main pump (18) to one of the circuits (33, 34) for supply of the fluid under the higher of the operating pressures to the volume adjusting means through pressure control lines (38, 38A or 41, 41A).

* * * * *